March 26, 1963　　K. J. LINDBLOM　　3,083,027
STABILIZING DEVICE FOR VEHICLES
Filed July 8, 1958　　3 Sheets-Sheet 1

INVENTOR
Knut Julius Lindblom

BY *Strauch Nolan & Neale*
ATTORNEYS

March 26, 1963  K. J. LINDBLOM  3,083,027
STABILIZING DEVICE FOR VEHICLES
Filed July 8, 1958  3 Sheets-Sheet 2
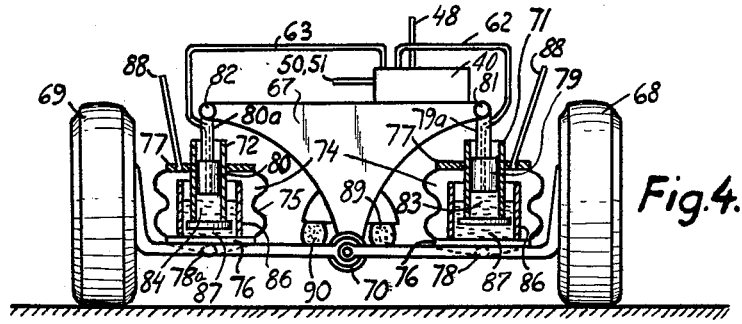
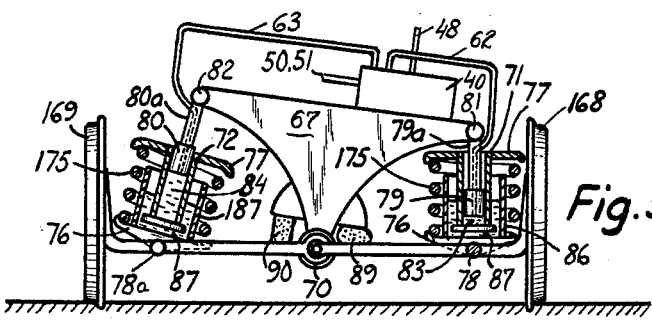
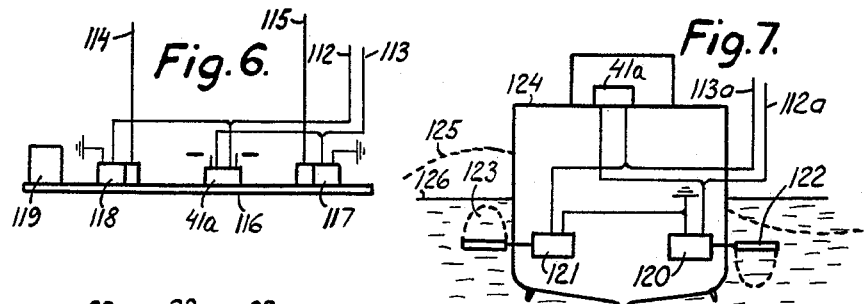
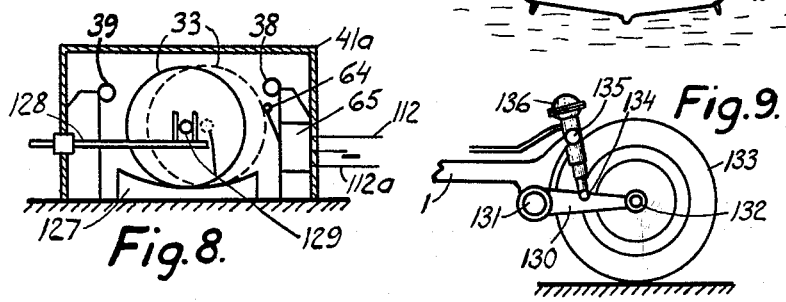
INVENTOR
Knut Julius Lindblom
BY
ATTORNEYS March 26, 1963 K. J. LINDBLOM 3,083,027
STABILIZING DEVICE FOR VEHICLES
Filed July 8, 1958 3 Sheets-Sheet 3
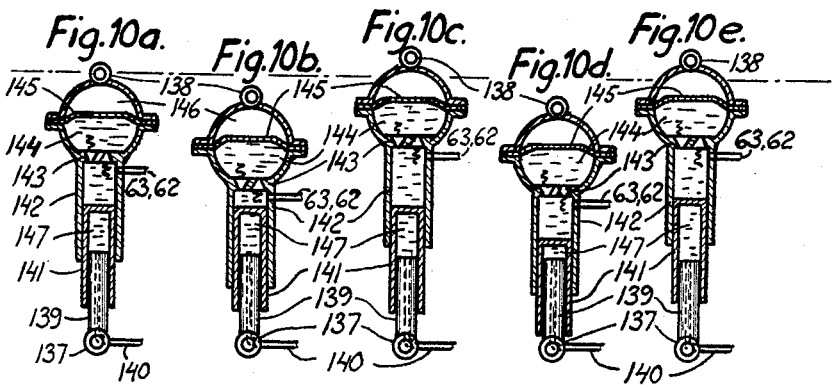
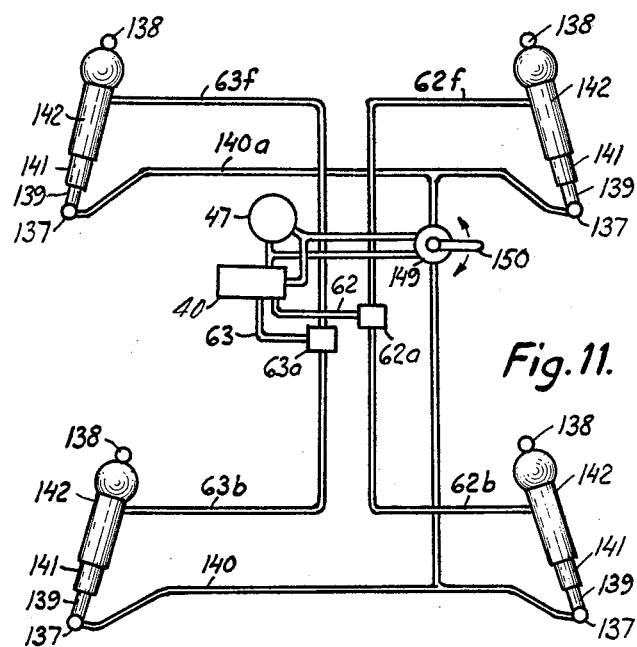
INVENTOR
Knut Julius Lindblom
BY *Strauch, Nolan & Neale*
ATTORNEYS United States Patent Office
3,083,027
Patented Mar. 26, 1963

3,083,027
STABILIZING DEVICE FOR VEHICLES
Knut Julius Lindblom, 11 Manhemsvagen,
Sollentuna, Sweden
Filed July 8, 1958, Ser. No. 747,185
Claims priority, application Sweden July 17, 1957
11 Claims. (Cl. 280—6.1)

This invention relates to a stabilizing device for vehicles. The object of the invention is to provide a stabilizing device which keeps the vehicle in such a position that if an open vessel filled with a liquid were placed in the vehicle, no liquid would leave the vessel irrespective of whether the vehicle were moving on a laterally sloping road or through a curve due to the fact that the stabilizing device comprises mechanisms for adjusting the position of the body of the vehicle in such a way that the floor of the vehicle is always substantially parallel to the liquid surface. A device of this kind is suitable for use in, for instance, ambulances, busses, automobiles, railway vehicles, single rail trains and vehicles for the transport of animals, since the passengers do not notice if the vehicle is moving through a curve or on a laterally sloping road.

The invention may also be applied to elevators in which a platform is suspended by two or more wires driven by separate machineries, to keep the platform in horizontal position by momentarily shutting off the machinery which may be running too fast.

The invention can also be used for controlling the ailerons of an aircraft or the fins provided on ships for preventing the ship from rolling. The stabilizing device actuates the ailerons or fins so as to counteract any tendency of rolling of the aircraft or ship.

According to the invention the stabilizing device comprises a movable body, e.g. a ball, roller or weight, which normally occupies a neutral position on its base or support but is caused to leave the neutral position when acted upon by forces of inertia, centrifugal forces or similar external forces and remains displaced from its neutral position as long as said forces are acting upon it. When moved from its neutral position the body actuates means, e.g. a pressure valve or electric contacts, controlling positioning or tilting means. If desired, means responsive to changes in the direction of movement can be provided for momentarily increasing the speed of operation of the positioning mechanisms. The positioning of the vehicle or craft is effected by the application of a pressure medium or of electric power to the positioning mechanisms. The positioning mechanisms may be combined with spring means and have associated therewith means striving to restore the whole arrangement to its neutral position.

Different vehicular forms operate on or in various supporting mediums. For example: wheeled vehicles use fixed tracks or the ground; airplanes use air; ships use water; and elevators generally use a fixed lower or overhead support structure. The position of the vehicle body relative to the support media is determined by components on the body which engage the support media and function to provide supporting action on the body. If these components can be adjusted relative to the vehicle body to change body position relative to the support media, they can be generally designated, for purposes of this invention, as stabilizing components. Examples are, for wheeled vehicles, the wheels which are fastened to the body; for airplanes, the ailerons, rudders, elevators and other trim components; for ships, the roll fins and other trim components; and for elevators which use cables for suspension, the cables can be considered as the stabilizing components.

The invention will be described more in particular in conjunction with the accompanying drawings which show by way of example some embodiments of the invention.

FIGURE 4 shows a wheel and axle system for a road vehicle with body suspension means and positioning means.

FIGURE 5 shows a wheel and axle system for a rail vehicle with body suspension means and positioning means.

FIGURE 6 shows a stabilizing device applied to the hoisting machinery of a platform suspended on wires.

FIGURE 7 shows a control device for the stabilizing rudders of a ship.

FIGURE 8 shows another embodiment of the device.

FIGURE 9 shows a position adjusting device associated with the frame and a wheel suspension lever of a vehicle.

FIGURES 10a and 10e show a combined position adjusting and spring device in different working positions.

FIGURE 11 shows a circuit diagram of the pipe system interconnecting the controlling and adjusting devices of a vehicle.

Figure 1:
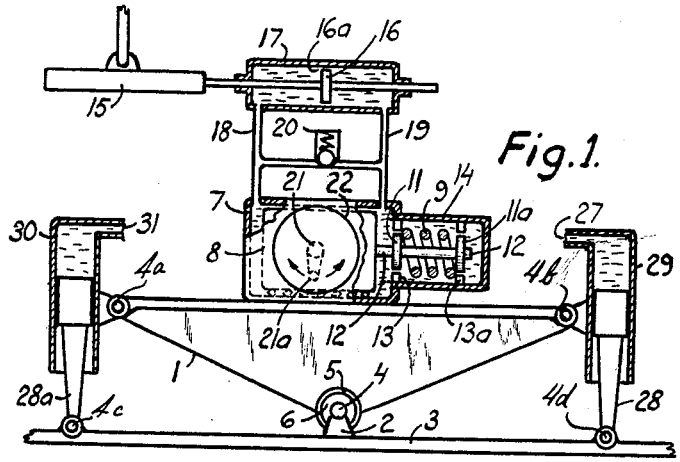
FIGURE 1 shows schematically a hydraulic system with controlling units for stabilizing a vehicle.

FIGURE 1 shows part of a vehicle body 1 and an axle 3 which carries wheels (not shown) of the vehicle. The body 1 is pivotally mounted on the axle 3 by means of a trunnion 4 carried by a post 2 which is attached to the axle 3. The bearing for the trunnion 4 consists of a ring 5 attached to the body 1 and having an internal diameter which is larger than the diameter of the trunnion 4. The space between the ring 5 and the trunnion 4 is filled with elastic material 6, for instance rubber.

The body 1 can be tilted about trunnion 4 by means of two expansible members, each consisting of a cylinder 29 and 30 and a piston 28 and 28a, respectively. The lower ends of the pistons 28 and 28a are pivotally connected to the axle 3 at points 4d and 4c, respectively. The cylinders 29 and 30 are pivotally connected, respectively, to the opposite sides of the body 1 at points 4b and 4a.

Figure 2:
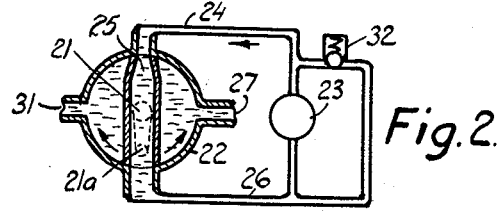
FIGURE 2 shows a hydraulic pump-valve system.

The upper parts of the cylinders 29 and 30 are connected with means for supplying a liquid, for instance oil, under pressure to the cylinders through pipes 27 and 31, respectively. The means for supplying liquid to the cylinders 29 and 30 is carried by the body of the vehicle and is shown in detail in FIGURE 2. It comprises a distribution valve 22 to which the pipes 27 and 31 are conected, and a liquid pump 23 which may be driven by the motor of the vehicle. The pump 23 is connected with valve 22 by pipes 24 and 26. The valve 22 comprises a rotatable member 21 having a channel 25. When member 21 is in its initial position as shown in FIGURE 2, channel 25 interconnects the openings in the valve housing where pipes 24 and 26 from the pump 23 terminate. Thus, as long as valve member 21 is in the illustrated position, the liquid propelled by the pump 23 merely circulates in a closed path formed by the pump, pipes 24 and 26 and channel 25, and in this case no liquid is supplied to or removed from pipes 27 and 31. When the valve member 21 is rotated in one direction or the other from its initial position, the pump 23 is connected with pipes 27 and 31 in such manner that liquid flows from the pump to one of these pipes and to the pump from the other pipe, and thus liquid is supplied to one of the cylinders 29, 30 and removed from the other cylinder, whereby the body 1 of the vehicle is laterally tilted about the pivot 4.

The pump 23 is by-passed by a pipe having an overload valve 32 which opens if the pressure in the liquid exceeds a permissible value. The valve 32 may be so designated that it opens more easily at high pump speeds than the low ones.

An operating member 21a for rotating the valve member 21 is linked with a movable body or weight 8 (FIGURE 1) which is enclosed in casing 7 carried by the body of the vehicle. The weight 8 is laterally movable within the casing 7 in either direction from an initial position in which it is held by a coil spring 9. Spring 9 is carried by a rod 12 which is attached to the weight 8 and provided with two flanges 11 and 11a between which the spring 9 is positioned. The rod 12 and spring 9 are contained in an extension 14 of the casing 7, and the inner wall of this extension has two flanges 13 and 13a which are spaced apart a distance equal to the distance between flanges 11 and 11a on rod 12. The diameter of spring 9 is larger than the internal diameter of the flanges 13 and 13a, and therefore when the weight 8 is moved from its initial position, the spring 9 will be compressed either between flanges 11 and 13a or between flanges 11a and 13 according to the direction of movement of weight 8.

In its initial position weight 8 keeps the valve member 21 of valve 22 in the position shown in FIGURE 2.

The casing 7 is filled with a liquid. The ends of casing 7 are connected by pipes 18 and 19 with the ends of a cylinder 17 which is likewise filled with liquid. A piston 16 which is attached to a rod 15, is movable within cylinder 17. The diameter of the piston 16 is somewhat less than the internal diameter of the cylinder 17.

The rod 15 is linked with the steering mechanism (not shown) of the vehicle, so that when the steering mechanism is operated in order to change the direction of movement of the vehicle, the rod 15 is displaced in its longitudinal direction thereby causing piston 16 to be displaced within the cylinder 17.

If the piston 16 is displaced within the cylinder 17 the pressure in the liquid at one side of the piston will be raised and the pressure in the liquid at the other side of the piston will be lowered. Since the diameter of the piston 16 is somewhat less than the internal diameter of the cylinder 17, the pressures on either side of the piston are equalized to some extent by liquid flowing from one side of the piston to the other through the space 16a between the piston and the inner wall of the cylinder, but if the displacement of the piston 16 occurs at a sufficiently high speed, the excess pressure at one side of the piston will force liquid through pipe 18 or 19 out into casing 7 thereby causing the pressure in the liquid at one end of weight 8 to become higher than the pressure in the liquid at the other end of the weight.

There is a small clearance between the weight 8 and the longitudinal walls of casing 7 so that liquid can flow from one end of the casing to the other through this clearance. However, if liquid is supplied at a sufficiently high rate from the cylinder 17 through pipe 18 or 19 to one or the other end of the casing 7, the liquid pressure at that end of the casing becomes sufficiently high to cause the weight 8 to move in the direction from that end of the casing. Assuming for instance that rod 15 with the piston 16 is moved at a sufficiently high speed to the left, liquid will thus be forced out from the lefthand part of cylinder 17 through pipe 18 into the lefthand end of casing 7, thereby causing weight 8 to move towards the righthand end of casing 7, the weight 8 in turn causing liquid to be forced out from the latter end of casing 7 through pipe 19 into the righthand part of cylinder 17.

The pipes 18 and 19 are directly interconnected by a by-pass pipe being provided with a valve 20 which serves as a safety valve and is opened if the pressure in some part of the system consisting of cylinder 17 and casing 7 should become too high.

As long as the vehicle moves along a straight path and there is no lateral incline of the road, the various movable members of the device will assume the positions shown in FIGURES 1 and 2. A change of direction of the movement of the vehicle gives rise to a centrifugal force acting upon weight 8. The operation of the steering mechanism for changing the direction of movement causes a displacement of piston 16 in cylinder 17, and this displacement may also give rise to a force acting upon weight 8 as explained above. The steering mechanism is so linked with the piston 16 that the latter force is of the same direction as the centrifugal force.

Assuming now that the change of direction of the movement of the vehicle is such that the resulting lateral forces acting upon weight 8 moves the weight towards the righthand end of the casing 7, the rotatable member 21 of valve 22 will be rotated in a counterclockwise direction. Hereby liquid propelled by pump 23 in the direction indicated by the arrow in FIGURE 2 will flow from pipe 24 through the valve housing and pipe 27 into the cylinder 29, and at the same time liquid flows from cylinder 30 through pipes 31 and 26 back to the pump 23. Thus cylinder 29 is raised and cylinder 30 is lowered causing the body of the vehicle to be laterally inclined. Due to this incline the weight 8 is now subjected to another force resulting from gravity and acting in a direction opposite to that of the centrifugal force, and therefore the weight 8 is restored to its initial position in casing 7. Hereby the valve member 21 is restored to its initial position, and the flow of liquid to cylinder 29 and from cylinder 30 is stopped. If the vehicle continues to move at constant speed through a curved path of constant radius, the weight 8 remains in its initial position, the body of the vehicle being maintained in an inclined position such that the resultant force of the gravity and the centrifugal force is directed substantially at right angles to the floor of the body of the vehicle. When the radius of the curved path of movement or the speed of the vehicle is changed, this state of equilibrium is disturbed, so that the weight 8 is displaced again and operates the valve 22, thereby causing a change in the incline of the vehicle body so as to restore the said state of equilibrium.

Figure 3:
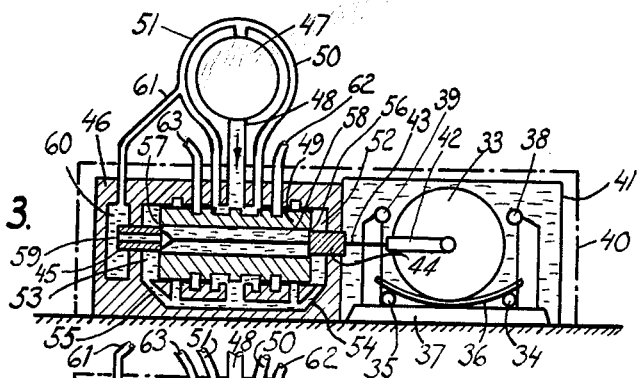
FIGURE 3 shows another embodiment of the weight-valve mechanism.
Figure 3A:
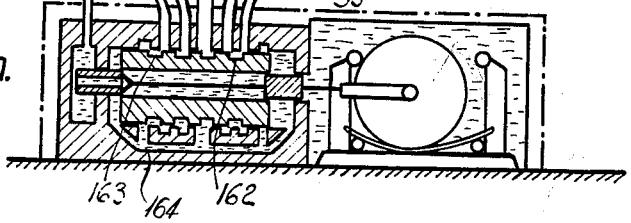
FIGURE 3a shows the mechanism of FIGURE 3 in an operated condition.

FIGURES 3 and 3a show another embodiment of the combination of a weight and a valve mechanism 40 forming part of the invention.

The weight consists of a roller 33 which may be of cylindrical or spherical form. Roller 33 rests on one or more leaf springs 36 which are supported at their ends by supporting members 34 and 35 resting on a base plate 37. The supporting members 34 and 35 are preferably cylindrical bodies.

Since the leaf spring 36 is loaded by the roller 33, it is deformed so that the upper surface of the spring on which the roller rests, becomes concave. The roller 33 can roll along this concave surface under the influence of centrifugal and gravitational forces. The movement of the roller is limited by two stop members 38 and 39. The roller 33 and its supporting means are enclosed in a housing 41 which may be filled with a liquid serving as a damping medium.

The valve comprises a housing 46 containing a piston 49 which can move in its longitudinal direction in a cavity in the housing 46. The piston 49 is provided with circumferential grooves which coact with pipes connected to the housing 46 and with channels in the walls of the housing to provide different flow paths for a pressure liquid according to the position of the piston 49.

Pressure liquid is supplied to the valve from a pump 47 through pipe 48 and is returned to pump 47 through pipes 50 and 51. Pipes 62 and 63 connect the valve with expansible members for tilting the body of the vehicle with respect to the axle system. These expansible members are not shown in FIGURES 3 and 3a. They may be of the design illustrated in FIGURE 1 or of the design illustrated in FIGURES 4 and 5 to be described later.

The valve piston 49 is provided with a longitudinal channel 58. Two smaller movable pistons 44 and 45 are arranged at the ends of piston 49 so that they fit slidably in the channel 58. The pistons 44 and 45 are interconnected with each other so that they move in unison, and the distance between them is somewhat smaller than the length of channel 58. The pistons 44 and 45 are connected with the roller 33 by means of a pin 43 and a yoke 42, so that the pistons are displaced when the roller 33 is moved along the leaf spring 36.

Piston 45 also slidably fits in an opening in a partition wall separating spaces 53 and 60, the latter space being connected with the pump 47 through pipe 61. Piston 45 has a longitudinal channel 59 through which liquid can flow from channel 58 or space 53 into space 60.

FIGURE 3 shows the roller 33 and the valve mechanism in an initial or neutral position. In this position of the valve piston 49, grooves on the piston 49 are so located with respect to the openings for pipes 48, 50 and 51 that pressure liquid flows from pipe 48 and back to the pump through both pipes 50 and 51, whereas the pipes 62 and 63 are shut off from the liquid circulation path. Pressure liquid is also forced into spaces 52 and 53 through channels 54 and 55. The liquid in spaces 52 and 53 exerts equal pressure on both ends of piston 49 so that this piston is not moved.

If now the roller 33 is displaced from its neutral position under the influence of centrifugal or other force, the pistons 44 and 45 are displaced in the same direction. Then, according to the direction of the displacement, one or the other of the pistons 44 and 45 will be moved out of channel 58 so that a gap is formed at end 56 or end 57 of channel 58. This results in a drop of pressure in the liquid in space 52 or 53, since liquid can now flow from space 52 or 53 into space 60 and thence back to the pump 47 through pipe 61. Thus, there will be excess pressure at one end of valve piston 49 which causes piston 49 to move in the same direction as pistons 44 and 45 until both ends of the channel 58 are again closed by the last mentioned pistons.

Assuming now that the roller 33 and the valve piston 49 have been moved to the position shown in FIGURE 3a, pressure liquid can flow from pipe 48 through channel 164 and groove 163 to pipe 63, so that liquid is supplied to the expansible member connected to pipe 63. At the same time groove 162 affords a direct connection between pipes 59 and 62, so that liquid is removed from the expansible member connected to pipe 62 and returned to the pump 47. The expansible members cause the body of the vehicle to incline laterally, and when the incline becomes large enough, the roller 33 is caused by gravity to return to its neutral position. Hereby the valve piston 49 is also restored to its initial position, and the flow of liquid to and from the expansible members is stopped.

FIGURE 4 shows a cross section of part of a road vehicle provided with stabilizing and tilting means controlled by the weight and valve device described with reference to FIGURES 3 and 3a. In FIGURE 4 this device is only indicated by a box designated 40. It is carried by the body 67 of the vehicle and is connected by pipes 62 and 63 to expansible members provided between the sides of the vehicle body and the axle system of the vehicle.

The body 67 is pivotally mounted on the axle system at 70. The expansible members are combined with spring and shock absorbing means to form units pivotally connected to the body at points 81 and 82 and to the axle system at points 78 and 78a.

The springs 74 are of the gas type consisting of a bellows-shaped portion 75 of flexible material, for instance rubber, arranged between two end plates 76 and 77 to form a closed space which is filled with gas. A hollow piston or cylinder 71, 72 is attached to the end plate 77 and extends into a cylinder 86 located inside the bellows-shaped portion 75. Cylinder 86 contains a liquid 87 which serves as damping medium to provide shock absorption. Shock absorption may also be attained by providing a special valve in the pressure feeder pipe 88 of the gas spring 74.

The cylinder 71, 72 which served as part of the shock absorbing means, also forms part of the expansible member controlled by the weight and valve mechanism 40. A piston 79, 80 is slidably fitted in cylinder 71, 72 and has a piston rod 79a, 80a pivotally attached to the body 67 of the vehicle. The liquid supply pipes 62 and 63 are connected through channels in the piston rods 79a and 80a to the cylinder spaces 83 and 84, respectively.

When the weight and valve mechanism is operated as described above, liquid will be supplied to one of the cylinders 71 and 72 and removed from the other cylinder, thereby turning the body of the vehicle about the pivot 70. Elastic members 89 and 90 may be provided between the axle system and the body of the vehicle to produce a force striving to return the body to its neutral position.

FIGURE 5 illustrates the application of the invention to a railroad vehicle. FIGURE 5 is similar to FIGURE 4, the main difference being that the springs 175 are ordinary coil springs instead of gas springs. In other respects the description of FIGURE 4 also applies to FIGURE 5. The body 67 of the vehicle is shown in inclined position.

It will be realized that tilting function of the expansible members 71—79 and 72—80 in FIGURES 4 and 5 does not interfere with or influence the ordinary function of the spring and shock absorbing means.

The weight (e.g., 33 in FIGURE 3) which forms part of the control device according to the invention can also be combined with electric contacts to be operated by the weight when it is displaced from its neutral position. The electric contacts can be used for controlling, for instance, the hoisting machinery of an elevator as illustrated in FIGURE 6. The weight with its housing is designated 41a and is carried by the platform 116 of an elevator. Platform 116 is suspended on wires 114 and 115 which are attached to hoisting machineries 118 and 117, respectively. Electrical circuits 112 and 113 for controlling the hoisting machineries are connected to contacts in the weight device arranged so that one circuit is opened when the weight moves to one side and the other circuit is opened when the weight moves to the other side. How the contacts are arranged will be described with reference to FIGURE 8.

If the platform is unilaterally loaded with a load 119, hoisting machinery 118 will lag behind so that the platform is inclined. Hereby the weight in the weight device is displaced from its neutral position and cuts off the current to hoisting machinery 117. The hoisting machinery 118 continues to operate so that the platform is restored into horizontal position, whereupon the weight is restored to its neutral position. Thus the weight serves to keep the platform horizontal even if the platform is unevenly loaded.

FIGURE 7 illustrates how the weight device 41a can be used to control stabilizing means for a ship. The weight device 41a having electric contacts as shown, for instance, in FIGURE 8 controls the electric circuits 112a and 113a for driving machineries 120 and 121 which actuate stabilizing rudders 122 and 123 so that the ship 124, despite the motion of the sea as indicated by the wave 125 will be kept virtually in the same position as in calm weather indicated by the line 126.

FIGURE 8 illustrates an alternative design of the weight device of FIGURE 3. In FIGURE 8 the roller 33 rests on a concave surface of a solid body 127 instead of on leaf springs as is the case in FIGURE 3. The roller 33 in FIGURE 8 is connected to the valve mechanism by means of a device 128 which permits vertical movement of the shaft 129 of the roller 33.

FIGURE 8 also illustrates how the weight can be combined with electrical contact devices. 65 designates an electric switch, for instance a so-called microswitch, with an operating lever 64. The switch is so positioned that when the roller 33 moves towards the right, it strikes the lever 64 thereby causing the switch to close or open a circuit 112—112a. A similar switch may, of course, also be provided at the opposite side of the weight housing.

Of course, it will be understood that when the weight type of control device 41a, illustrated in FIGURE 8, is utilized to control electrically operated positioning means, the weight will control by means of switches such as indicated at 65. There will be no fluid operator means nor will there be any control valve. The valve control link 128 of FIGURE 8 would be superfluous in an electric control embodiment.

FIG. 9 shows a vehicle with a lever 130 journalled at 131 in the chassis 1 and at 132 in the wheel 133. Combined spring and adjusting devices 136 operate between bearing 134 on the lever and bearing 135 on the chassis.

FIGS. 10a to 10e show a combined adjusting, position-maintaining and springing mechanism. Bearing 137 is attached to the axle systems and bearing 138 to the body (chassis). FIG. 10a shows the normal position. Piston 139 is attached to bearing 137. The incoming circuit 140 runs through this piston. A cylinder 141 operates in conjunction with this piston and acts itself as a piston for cylinder 142. Through circuit 62, 63 pressure medium has been removed in FIG. 10b, and supplied in FIG. 10c, so that the chassis has assumed for instance the position indicated by a sloping line. Irrespective thereof, the device acts as a spring since pressure medium can pass the shock absorbing valves 143 up to space 144 which is limited by diaphragm 145. Above the diaphragm is a closed section containing compressed gas which constitutes the springing element 146. By removing pressure medium from space 147 the device can be shortened as in FIG. 10d, and by adding pressure medium the device can be lengthened as in FIG. 10e.

FIGURE 11 schematically illustrates a complete stabilizing system for a four-wheel vehicle. The system includes four positioning adjusters and spring elements of the kind described with reference to FIGURES 10a–10e and a combined weight and valve control mechanism 40 of the kind described with reference to FIGURES 3 and 3a. The pipes 62 and 63 for carrying pressure medium to and from the positioning elements are connected to distributing valves 62a and 63a respectively for distributing pressure medium between the front and rear axle systems. Branch pipes 63b and 63f connect the valve 63a with the positioning elements associated with left-hand rear and front wheels respectively, and branch pipes 62b and 62f connect distributing valve 62a with the positioning elements associated with the right-hand rear and front wheels respectively.

When the movable weight (33 in FIGURE 3) in the mechanism 40 is displaced under the influence of centrifugal or gravitational force, pressure medium is supplied to the left-hand positioning elements and withdrawn from the right-hand positioning elements or vice versa according to the direction of movement of the weight, thus causing the left-hand positioning elements to expand and the right-hand positioning elements to contract or vice versa.

The system shown in FIGURE 11 also includes means for raising the front axle and lowering the rear axle or vice versa to maintain the vehicle in horizontal position despite fore and aft changes in the distribution of the load. These means consist of a valve 149 having a handle 150 for operating the valve manually. The valve 149 connects the pump 47 with the positioning elements associated with the front axle over pipe 140a and with the positioning elements associated with the rear axle over the pipe 140. The pipes 140a and 140 are connected with the space 147 (FIGURES 10a–10e) in the positioning elements. When the valve 149 is operated, pressure fluid is supplied to the rear positioning elements and withdrawn from the front positioning elements or vice versa according to the direction in which handle 150 is moved. The valve 149 may also be combined with means similar to 40 for operating it automatically.

What is claimed is:

1. A stabilizing device for use in combination with moving bodies, comprising: a body positioning mechanism; control means for selective control of said positioning mechanism; a position and force responsive device for actuating said control means comprising support means adapted to be secured to the moving body, at least one leaf spring supported adjacent its ends on said support means, a roller resting on and deflecting said at least one leaf spring, and means connecting said roller with said control means, said roller being displaceable along said leaf spring under the influence of gravitational and centrifugal forces resulting from movement and displacement of the body to actuate said control means.

2. A stabilizing device as claimed in claim 1 in which said support means carrying said leaf spring are cylindrical bodies, the leaf spring resting adjacent its ends on the curved surfaces of said cylindrical bodies.

3. In a vehicle having an axle system and a body mounted on said axle system; a positioning mechanism for adjusting the position of the body with respect to the axle system, control means for selective control of said positioning mechanism, supporting members attached to said body, at least one leaf spring resting on said supporting members, a roller resting on said leaf spring between said supporting members and enabled to roll along said leaf spring under the influence of gravitational and centrifugal forces, and means connecting said roller with said control means to cause the positioning mechanism to adjust the position of the body with respect to the axle system in response to said forces.

4. A stabilizing device for vehicles, comprising a vehicle positioning mechanism including expansible elements, means for supplying a liquid to said expansible elements to control the expansion thereof, supporting means having a concave upper surface adapted to be attached to the body of the vehicle, a roller resting on said concave surface and being displaceable from a neutral position under the influence of external forces acting in predetermined directions, valve means for controlling the supply of liquid to said expansible elements, and means linking said roller with said valve means to cause the operation of the valve means in response to the motion of the roller.

5. A stabilizing device as defined in claim 1 wherein said control means comprises electric operating means for said positioning mechanism, and control circuits for said electric operating means including contact means operable by said roller.

6. In a vehicle, a wheel and axle system, a body mounted on said wheel and axle system, a plurality of resilient suspension elements connecting the body on opposite sides of its fore and aft axis with the wheel and axle system, each suspension element comprising expansible means, means for selectively supplying and removing a liquid under pressure to and from said expansible means to control the expansion condition thereof including reversing valve means for selectively distributing said liquid to and removing liquid from said expansible means belonging to different ones of said suspension elements, support means attached to the body of the vehicle, a movable weight made from solid material resting on said support means, said weight being displaceable in one or the other of two directions from a neutral position under the influence of gravitational and centrifugal forces, and means connecting said weight with said valve means to operate said reversing valve means in response to the displacement of said weight.

7. In a vehicle as defined in claim 6, each of said suspension elements comprising gas type resilient means and liquid type expansible means.

8. In a vehicle as defined in claim 6, each of said suspension elements comprising gas-liquid type resilient means and liquid type expansible means.

9. In a vehicle as defined in claim 6, each of said suspension elements comprising liquid type expansible means, and said means for supplying and removing liquid under pressure to said liquid type expansible means includes a vehicle steering mechanism and means connected with said steering mechanism responsive to rapid motion of said steering mechanism to operate said valve means.

10. In a vehicle, a wheel and axle system including front wheels and rear wheels, a body mounted on said wheel and axle system, suspension elements connecting the body with the wheel and axle system, each said suspension element comprising resilient means and hydraulic means for varying the length of the element, means for supplying a liquid under pressure to said hydraulic means, first valve means for controlling differentially the supply of liquid to the hydraulic means associated with wheels located at one side of the vehicle and the hydraulic means associated with wheels located at the other side of the vehicle to cause a lateral tilting of the body of the vehicle relative to the wheel and axle system about an axis parallel to the longitudinal axis of the vehicle, support means attached to the body of vehicle, a movable weight resting on said support means and being movable in directions normal to the longitudinal axis of the vehicle, means connecting said weight with said first valve means to operate said first valve means in accordance with the motion of the weight, second valve means for controlling differentially the supply of said liquid to the hydraulic means associated with the front wheels and the hydraulic means associated with the rear wheels to cause a longitudinal tilting of the body of the vehicle relative to the wheel and axle system about an axis normal to the longitudinal axis of the vehicle, and manually operable means for operating said second valve means.

11. A stabilizing device for vehicles comprising a body, a plurality of stabilizing components individually mounted on and adjustable relative to said body for supporting engagement with a medium upon which the vehicle may be supported, and a plurality of positioning elements connected on said body and connected to associated ones of said stabilizing components, each positioning element comprising operating means, means for controlling operation of said operating means belonging to said positioning elements, support means attached to the body of the vehicle, a movable solid weight resting on said support means, said support means and said weight comprising cooperative structural means enabling said weight to be displaceable from a neutral position under the influence of gravitational and centrifugal forces, and means connecting said weight with said control means to operate said operating means in response to the displacement of said weight.

References Cited in the file of this patent
UNITED STATES PATENTS

| | | |
|---|---|---|
| 2,174,997 | Ronk | Oct. 3, 1939 |
| 2,353,503 | Rost et al. | July 11, 1944 |
| 2,474,471 | Dolan | June 28, 1949 |
| 2,649,311 | Hetrick | Aug. 18, 1953 |
| 2,656,194 | Saulsbury | Oct. 20, 1953 |
| 2,687,311 | Nallinger | Aug. 24, 1954 |